(12) United States Patent
Kim et al.

(10) Patent No.: US 7,617,058 B2
(45) Date of Patent: Nov. 10, 2009

(54) BIOMETRIC APPARATUS AND METHOD USING BIO SIGNALS

(75) Inventors: Kyung-ho Kim, Yongin-si (KR); Kyeong-seop Kim, Chungju-si (KR); Tae-ho Yoon, Siheung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 94 days.

(21) Appl. No.: 11/268,599

(22) Filed: Nov. 8, 2005

(65) Prior Publication Data
US 2006/0106571 A1     May 18, 2006

(30) Foreign Application Priority Data
Nov. 17, 2004    (KR) .................. 10-2004-0094260

(51) Int. Cl.
*G06K 9/00* (2006.01)
*G06F 19/00* (2006.01)

(52) U.S. Cl. ...................................................... 702/79
(58) Field of Classification Search .................. 702/79
See application file for complete search history.

(56) References Cited

U.S. PATENT DOCUMENTS

| | | | |
|---|---|---|---|
| 4,796,638 A | 1/1989 | Sasaki | |
| 5,645,069 A * | 7/1997 | Lee | ............. 600/518 |
| 5,719,950 A * | 2/1998 | Osten et al. | ............. 382/115 |
| 6,343,140 B1 * | 1/2002 | Brooks | ............. 382/115 |
| 6,491,629 B1 | 12/2002 | Bousseljot et al. | |
| 6,505,193 B1 * | 1/2003 | Musgrave et al. | ............. 707/3 |
| 6,609,023 B1 | 8/2003 | Fischell et al. | |
| 6,898,299 B1 * | 5/2005 | Brooks | ............. 382/115 |
| 6,939,288 B1 * | 9/2005 | Levin | ............. 600/28 |
| 6,993,378 B2 * | 1/2006 | Wiederhold et al. | ......... 600/509 |
| 7,181,763 B2 | 2/2007 | Hiraiwa et al. | |
| 7,245,960 B2 | 7/2007 | Yasushi et al. | |
| 7,249,263 B2 | 7/2007 | Chaudhari et al. | |
| 7,272,437 B2 | 9/2007 | Macadam et al. | |
| 7,302,088 B2 * | 11/2007 | Amano et al. | ............. 382/124 |
| 7,333,963 B2 | 2/2008 | Widrow et al. | |
| 2004/0044292 A1 * | 3/2004 | Yasushi et al. | ............. 600/509 |
| 2004/0243356 A1 * | 12/2004 | Duffy et al. | ............. 702/189 |
| 2005/0215919 A1 * | 9/2005 | Kim et al. | ............. 600/554 |
| 2005/0267597 A1 | 12/2005 | Flaherty et al. | |
| 2005/0273890 A1 | 12/2005 | Flaherty et al. | |

(Continued)

FOREIGN PATENT DOCUMENTS

JP     2004-248714     9/2004

OTHER PUBLICATIONS

Shen et al., "One-Lead ECG for identity Verification", 2002, IEEE, pp. 62-63.*

(Continued)

*Primary Examiner*—Tung S Lau
*Assistant Examiner*—Cindy H Khuu
(74) *Attorney, Agent, or Firm*—Staas & Halsey LLP

(57) ABSTRACT

A biometric apparatus and a method thereof using bio signals are provided. The apparatus includes an ADC, a periodic signal extractor, a template storing portion, a comparator. The ADC performs sampling of an input bio signal to convert the sampled bio signal into a digital signal. The periodic signal extractor extracts the periodic signals from the digital signal. The template storing portion registers a plurality of users and stores periodic signals for the respective registered users in a form of templates. The comparator computes similarity between the periodic signals outputted from the periodic signal extractor and the respective templates to select a template whose similarity is greatest and recognizes a user that corresponds to the selected template as a user who corresponds to the input bio signal.

26 Claims, 4 Drawing Sheets

U.S. PATENT DOCUMENTS

2005/0281439 A1* 12/2005 Lange ................. 382/115
2006/0106571 A1   5/2006 Kim et al.
2006/0215883 A1   9/2006 Kim et al.
2007/0142735 A1   6/2007 Shin et al.

OTHER PUBLICATIONS

Biel et al., ECG Analysis: A New Approach in Human Identification, Jun. 2001, IEEE, pp. 808-812.*

Development of an ECG Identification System, Masaki Kyoso et al., 2001 Proceedings of the 23$^{rd}$ Annual EMBS International Conference, pp. 3721-3723.

U.S. Appl. No. 11/312,442, filed Dec. 21, 2005, Kyung-ho Kim et al., Samsung Electronics Co., Ltd.

Office Action issued by U.S.P.T.O. on Feb. 5, 2009 in co-pending U.S. Appl. No. 11/312,442.

Notice of Allowance issued by U.S.P.T.O. on Jul. 24, 2009 in co-pending U.S. Appl. No. 11/312,442.

* cited by examiner

BIOMETRIC APPARATUS AND METHOD USING BIO SIGNALS

CROSS-REFERENCE TO RELATED APPLICATION

This application claims the benefit of Korean Patent Application No. 10-2004-0094260, filed on Nov. 17, 2004, in the Korean Intellectual Property Office, the disclosure of which is incorporated herein in its entirety by reference.

BACKGROUND OF THE INVENTION

1. Field of the Invention

The present invention relates to a biometric apparatus and a method thereof using bio signals, and more particularly, to an apparatus and a method for performing a Fourier analysis of a bio signal of a user and recognizing the user using the analyzed results.

2. Description of the Related Art

With a rapid development of information and telecommunication technology, development of a communication network is being extended to an everyday-life of a user. Generally, a public communication network called the Internet is developing in a direction that allows a user to freely carry out in virtual space economic activities that have been carried out in a real world. Under this environment, convenience of the virtual life and utilization of information are realized using computer-based information, thus management of the information is very important. The management of the information is intended for protecting an information system which is a physical tool and a security means for places providing such tools is required. A technology for recognizing a user has been applied for security of a terminal, an access-control system, and a certificates authority that is related to the security means. Accordingly, a biometric system using unique physical features of a user is being spot-lighted recently in a user-identification technology.

Primary considerations of the biometric system are convenience, productivity felt by a user who uses the biometric system, and an identification technology for accurate identification. Further, a speed at which the biometric system identifies physical features may be as important as the reliability thereof. The most important point that should be considered from a technical point of view in the biometric systems is an identification failure rate which can be a performance criterion of an identification system. The identification failure rate can be classified into a false acceptance rate (FAR) and a false rejection rate (FRR). The FAR means an identification failure rate that recognizes an unregistered user as a registered user and FRR means an identification failure rate that rejects a registered user. The FAR is more important than FRR for maintaining a high performance.

Traditionally, the biometric systems have been applied to the access-control system and are now applied to user's work-time management, criminal investigation, an automated teller machine (ATM), personal computer (PC) data management, a certificates authority for electronic commerce.

The biometric systems are roughly classified into a type identifying a fingerprint, a face, a retina, a vascular pattern, an iris, a venous distribution of a wrist or a back of a hand, a deoxyribonucleic acid (DNA) using physiological features and a method through a signature and a voice that uses a behavior or a characteristic form of an user.

SUMMARY OF THE INVENTION

Additional aspects and/or advantages of the invention will be set forth in part in the description which follows and, in part, will be apparent from the description, or may be learned by practice of the invention.

The present invention provides an apparatus and a method for identifying a user by extracting a periodic signal from a bio signal peculiar to a user and performing a Fourier analysis for the periodic signal.

According to an aspect of the present invention, there is provided a biometric apparatus including: an ADC (analog-to-digital converter) sampling an input bio signal to convert the sampled bio signal into a digital signal; a periodic signal extractor for extracting a plurality of periodic signals from the digital signal; a template storing portion registering a plurality of users and storing periodic signals for the respective registered users in a form of a template; and a comparator computing similarity between the periodic signals outputted from the periodic signal extractor and the respective templates to select a template whose similarity is greatest and recognizing a user who corresponds to the selected template as a user who corresponds to the input bio signal.

According to another aspect of the present invention, there is provided a biometric apparatus including: an ADC (analog-to-digital converter) sampling an input bio signal to convert the sampled bio signal into a digital signal; a periodic signal extractor for extracting a plurality of periodic signals from the digital signal; a periodic signal analyzer expanding the period signals to Fourier series to obtain Fourier coefficients for the periodic signals; a template storing portion registering a plurality of users and storing Fourier coefficients of periodic signals for the respective registered users in form of templates; and a comparator computing similarity between values outputted from the periodic signal analyzer and the respective templates to select a template whose similarity is greatest and recognizing a user who corresponds to the selected template as a user who corresponds to the input bio signal.

According to yet another aspect of the present invention, there is provided a biometric method including: detecting a bio signal containing periodic signals from a user and sampling the bio signal to convert the sampled bio signal to a digital signal; extracting a plurality of periodic signals from the digital signal; reading templates from a template storing portion in which a plurality of users are registered and storing periodic signals for the respective registered users in a form of templates and computing similarity between the templates and the periodic signals of the user, respectively; and recognizing a user that corresponds to a template whose similarity is greatest as the user.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
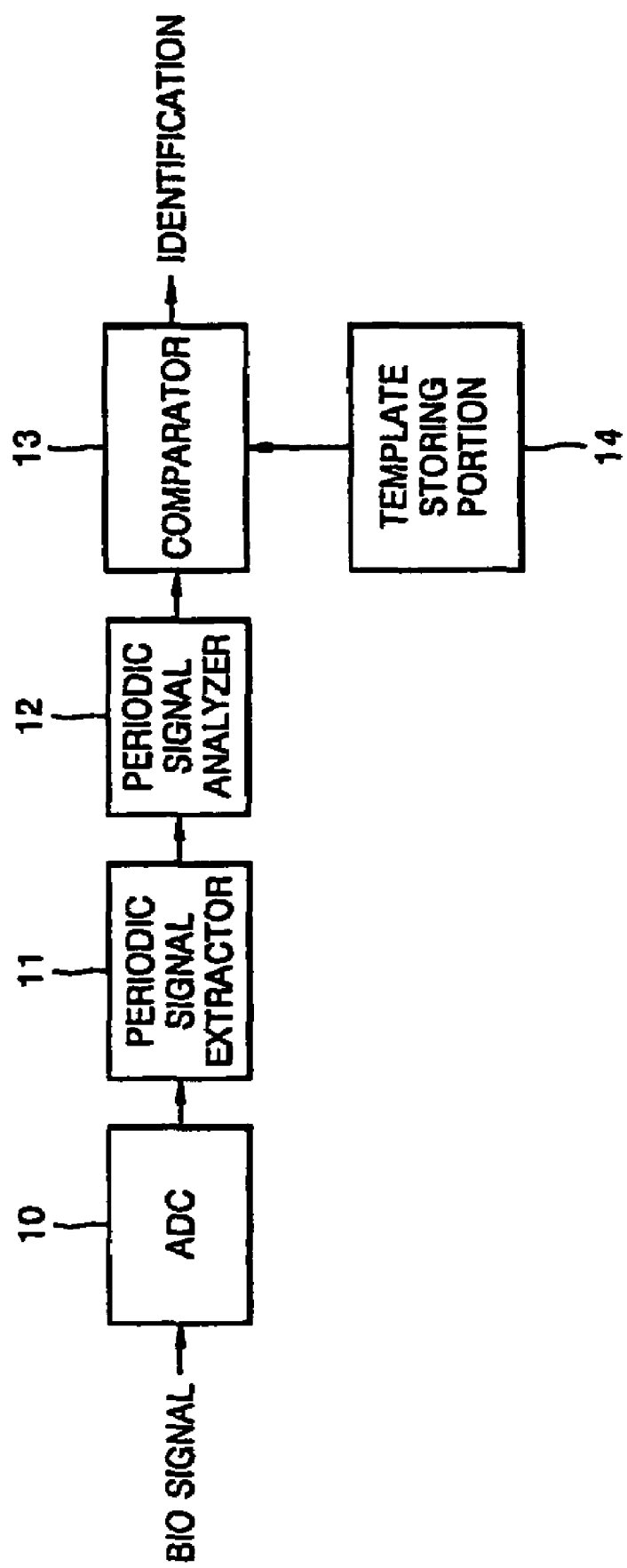
FIG. 1 is a block diagram of a biometric apparatus according to an embodiment of the present invention.

FIG. 1 is a block diagram of a biometric apparatus according to an embodiment of the present invention. The apparatus includes an ADC 10, a periodic signal extractor 11, a comparator 13, and a template storing portion 14, and can further include a periodic signal analyzer 12. Operations of the biometric apparatus will be described in detail with reference to FIG. 2.

Figure 2:
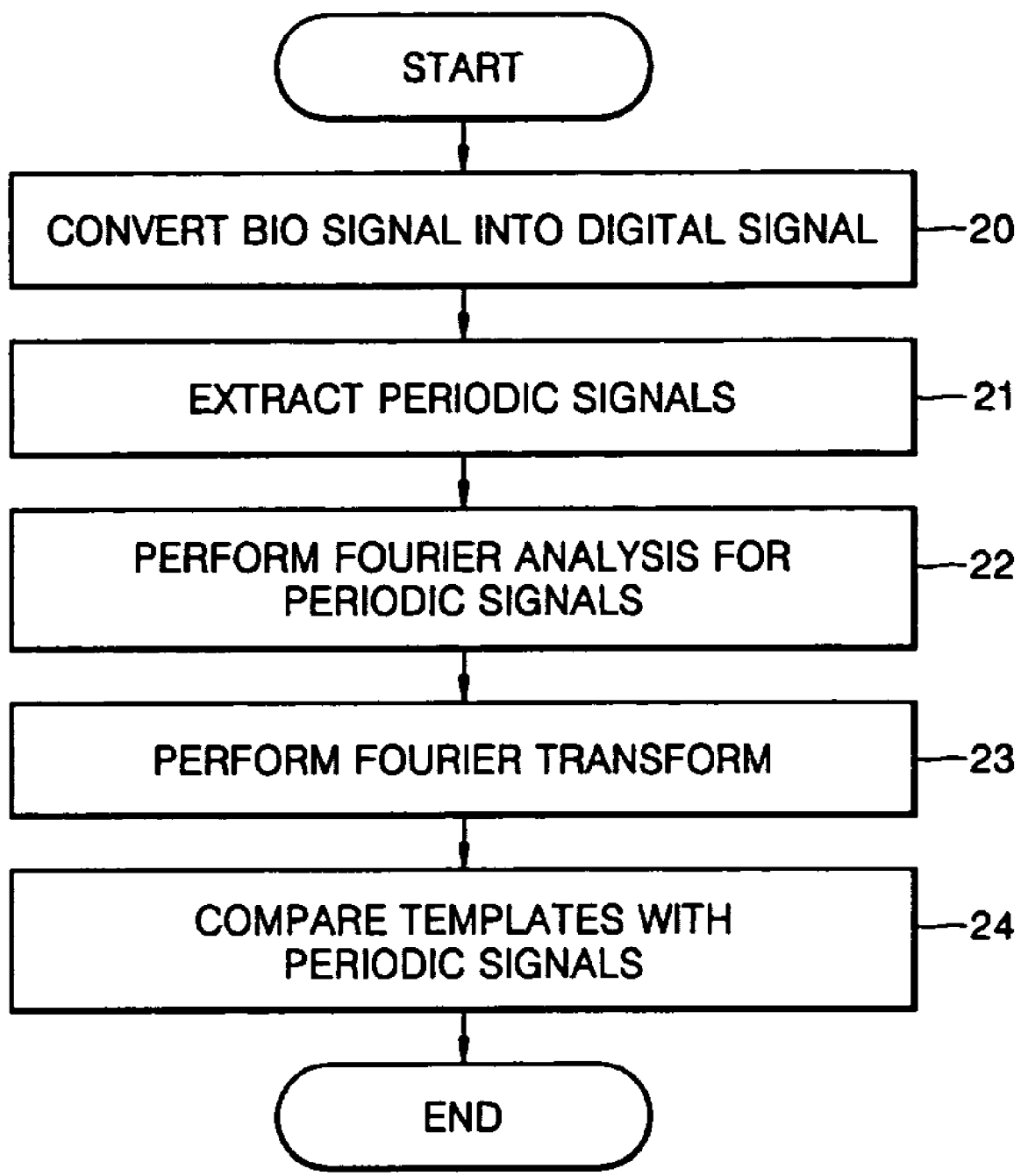
FIG. 2 is a flowchart of a biometric method according to an embodiment of the present invention.

FIG. 2 is a flowchart of a biometric method according to an embodiment of the present invention. The ADC 10 samples a bio signal and converts the sampled signal to a digital signal (operation 20). Here, the bio signal is a signal measured from a user who is to be identified and may be a signal having periodicity such as an electrocardiogram signal or a pulse wave signal. Even though it is exemplified using the electrocardiogram signal, the present invention is not limited to the electrocardiogram signal.

Figure 3A:
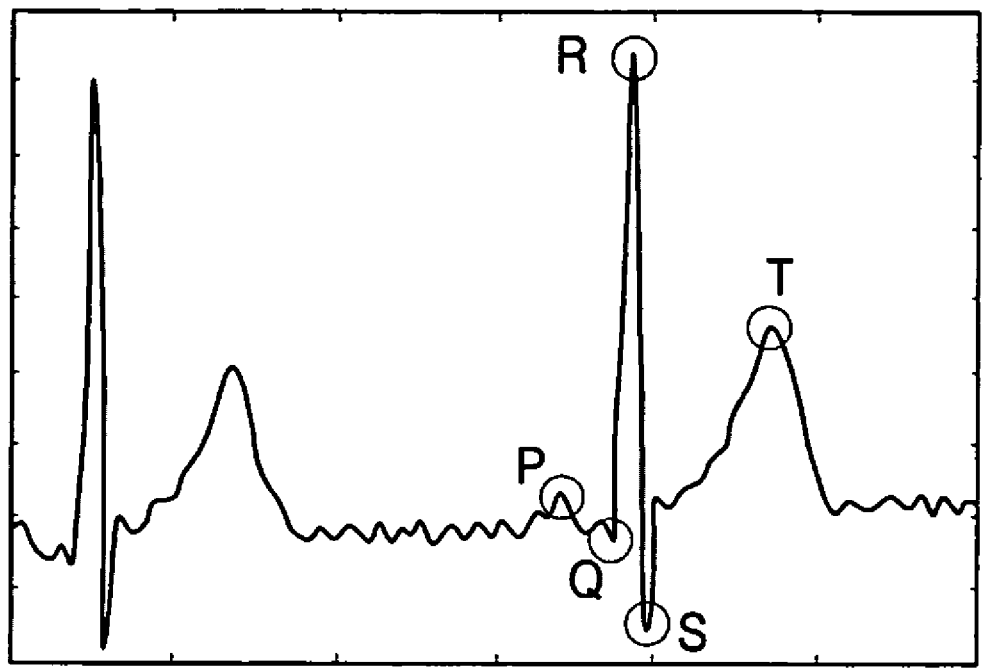
FIGS. 3A and 3B illustrate examples of electrocardiogram signals.
Figure 3B:
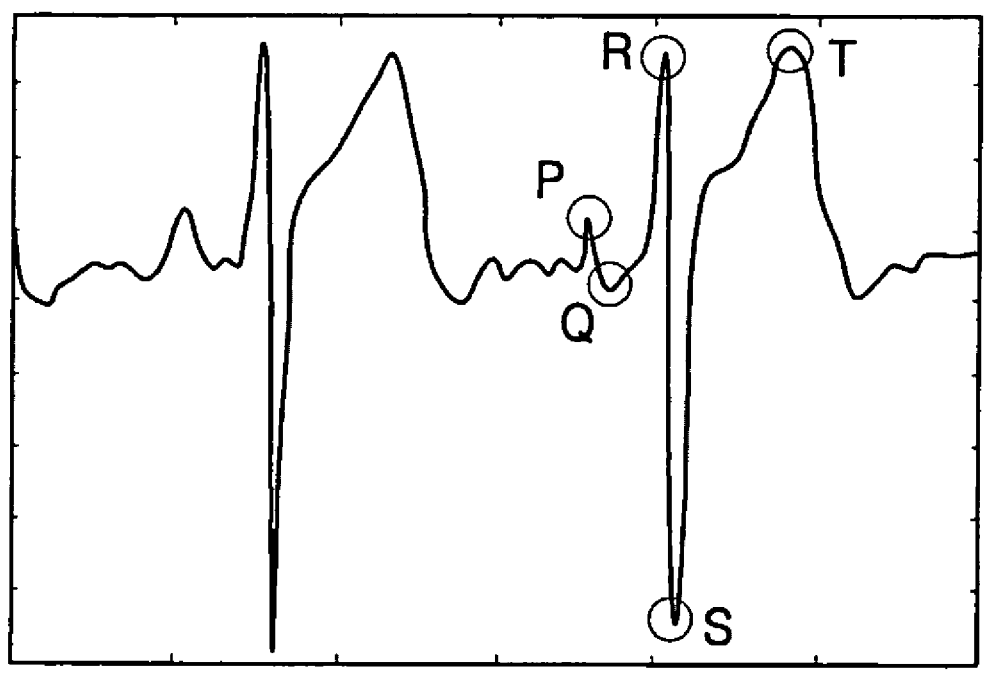

The periodic signal extractor 11 extracts a plurality of periodic signals periodically repeated from the digital signal (operation 21). FIGS. 3A and 3B illustrate examples of electrocardiogram signals, respectively.

Regarding to FIG. 3A and 3B, the periodic signal can include a portion including inflection points of P,Q,R,S,T which are periodically repeated in the electrocardiogram signal. Therefore, the periodic signals can be extracted using the inflection points. For example, an interval such as [P−15, T+15] between fifteen sample points before point P and fifteen sample points after point T can be extracted as a periodic signal.

Since the number of the samples in the interval of the periodic signal extracted from the periodic signal extractor 11 can be different depending on users, the present invention expands the periodic signal into a Fourier series to normalize the number of the samples of the periodic signal. Further, since Fourier coefficients for the electrocardiogram signal contain information on an electrocardiogram waveform peculiar to a user, it is proper to expand the periodic signal in terms of the Fourier series.

The periodic signal analyzer 12 expresses the extracted periodic signals in terms of the Fourier series (operation 22) and transforms the Fourier series into other spectrum domain if necessary (operation 23).

It is shown that an original waveform of the electrocardiogram signal is best recovered when the periodic signal is expanded to the 35-harmonic Fourier series.

$$f_N(t) = a_0 + \sum_{k=1}^{35} b_k \cos k w_0 t + \sum_{k=1}^{35} d_k \sin k w_0 t \text{ or,} \quad (1)$$

-continued
$$f_N(t) = \sum_{k=0}^{35} c_N \cdot e^{jkw_0 t}$$

where, N means one of a plurality of periodic signals extracted from one electrocardiogram signal.

Figure 4:
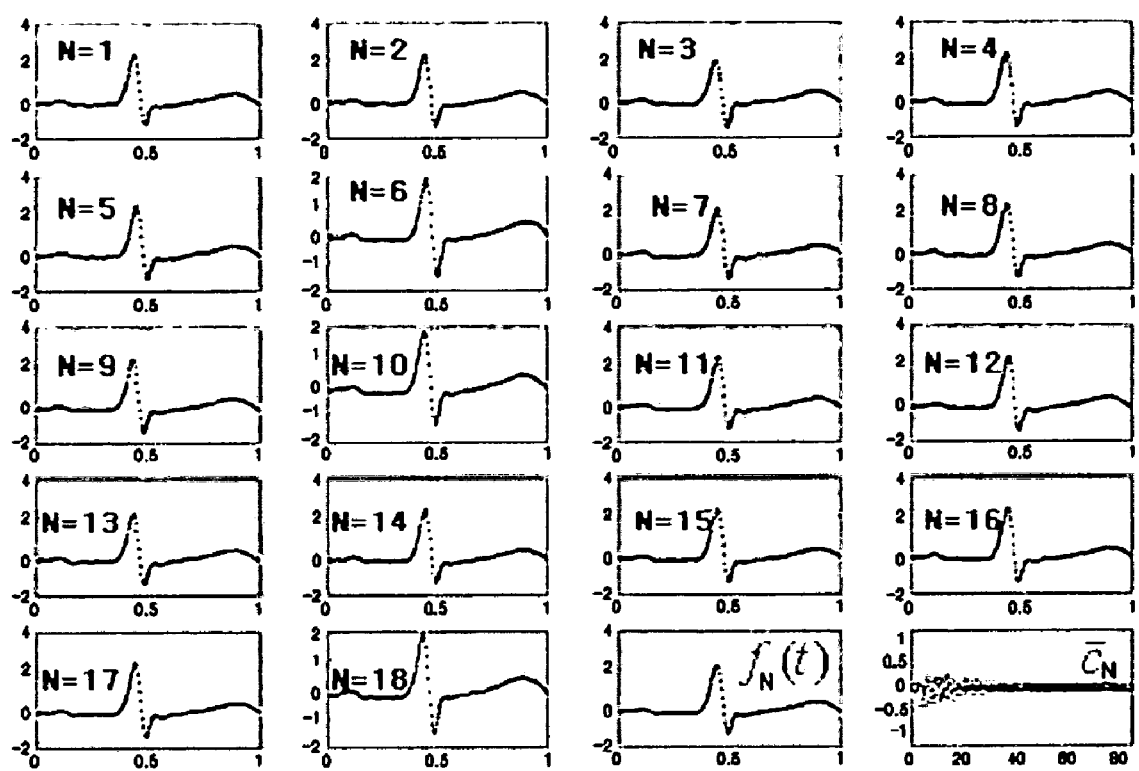
FIG. 4 illustrates examples of eighteen periodic signals extracted from a single electrocardiogram signal.

FIG. 4 illustrates examples of eighteen periodic signals extracted from a single electrocardiogram signal. In FIG. 4, $\overline{f_N(t)}$ represents a signal obtained by averaging the eighteen periodic signals and $\overline{c_N}$ represents an average of the Fourier coefficients.

As described above, it is possible to normalize an interval length of the periodic signals from the electrocardiogram signal using seventy one Fourier coefficients in total.

The Fourier coefficients $f_N(t)$ can be transformed into a Fourier coefficient spectrum through the Fourier transform as represented by the following equation.

$$F_N(t) = \sum_{k=1}^{m} c_N e^{jkw_0 t} \quad (2)$$

$$w_0 = \frac{2\pi}{T_0}$$

where, N=1 ... 18, m=71,

The template storing portion 14 registers a plurality of users and stores a template peculiar to each user for the respective registered users. The template can be sample values, Fourier coefficients, or Fourier coefficient spectrums for the electrocardiogram periodic signals of the respective users.

The obtaining of the template Fourier coefficients is performed by the same processes as those performed by the ADC 10, the periodic signal extractor 11, and the periodic signal analyzer 12. For example, presuming that templates for thirty users are to be obtained, a plurality, e.g. eighteen signals of electrocardiogram periodic signals can be extracted from an electrocardiogram signal of each user and the respective periodic signals can be expressed in terms of the Fourier series using the following equation.

$$f_{i,N}(t) = \sum_{k=0}^{35} c_{k,i,N} \cdot e^{jkw_0 t} \quad (3)$$

where, i=1, ... 30, N=1, ... 18

The template Fourier coefficients can be obtained by averaging the Fourier coefficients generated by Equation 2 over the eighteen electrocardiogram periodic signals extracted from each user as represented by the following equation.

$$\overline{f}_i(t) = \frac{\sum_{m=1}^{N} f_{i,m}(t)}{N} \quad (4)$$

where, i=1, ... 30, N=18

The template coefficient spectrums are expressed using the following equation by applying the Fourier transform of Equation 2 to the template Fourier coefficients.

$$\overline{F}_i(t) = \frac{\sum_{m=1}^{N} F_{i,m}(t)}{N} \quad (5)$$

where, i=1, ... 30, N=18

The comparator 13 authenticates or recognizes a user by judging a similarity between values of the templates stored in the template storing portion14 and values outputted from the periodic signal analyzer 12 (operation 24).

According to the present embodiment, the similarity is determined by computing distances between the sample values, the Fourier coefficients, or the Fourier coefficient spectrums stored in the template storing portion 14, and the sample values, the Fourier coefficients, or the Fourier coefficient spectrums outputted from the periodic signal analyzer 12, respectively.

First, the comparison between the sample values is performed as follows way. The distance between the sample values outputted from the periodic signal extractor 11 and the sample values for each user stored in the template storing portion 14 is computed using the following equation.

$$distance_i = \sum_n \sqrt{(\overline{f}_i(t) - f_n(t))^2} \quad (6)$$

where, i=1, ... 30, n=1, ... 18, $\overline{f}_i$: a sample value of i-th template, $f_n$: a sample value of n-th periodic signal The similarity between the Fourier coefficients is computed using the following equation.

$$distance_i = \sum_n \sqrt{(\overline{c}_i - c_n)^2} \quad (7)$$

where, i=1, ... 30, n=1, ... 18, $\overline{c}_i$: i-th template Fourier coefficient, $c_n$: n-th Fourier coefficient of an electrocardiogram signal The similarity between the Fourier coefficient spectrums is computed using the following equation.

$$distance_i = \sum_n \sqrt{(\overline{F}_i(t) - F_n(t))^2} \quad (8)$$

where, i=1, ... 30, n=1, ... 18, $\overline{F}_i$: i-th template Fourier coefficient spectrum, $F_n$: n-th Fourier coefficient spectrum of an electrocardiogram signal where, $\overline{F}_i$, $F_n$ can be values obtained through the fast Fourier transformation.

The comparator 13 obtains distances between the values outputted from the periodic signal extractor 11 or the periodic signal analyzer 12 with respect to the electrocardiogram signal of the user and the corresponding values stored in the template storing portion 14. The comparator 13 authenticates the user in a manner of 1:1 authentication or recognizes the user as one of the users stored in the template storing portion 14, namely, performing 1:N recognition.

In a case of 1:1 authentication, the comparator 13 authenticates the user if the computed distance between template values of a user selected as an authentication target from the template storing portion 14 and values outputted from the periodic signal extractor 11 or the periodic signal analyzer 12 is greater than a predetermined threshold. The comparator 13 determines the user as not being authenticated if the distance is smaller than or equal to the threshold. At this point, the threshold can be set experimentally by a person of skill in the art depending on a desired security level.

In case of 1:N recognition, the comparator 13 recognizes the user as a user who corresponds to a template whose distance between values stored in the template storing portion 14 and values outputted from the periodic signal extractor 11 or the periodic signal analyzer 12 is smallest.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The present invention performs biometric operations using waveform characteristics of a bio signal peculiar to an user and thus a recognition or authentication result is not influenced by action change and a trick of the user which has been pointed out as one of problems in the related art biometric system that uses a fingerprint, an iris, or a human face.

Further, a user is recognized using the electrocardiogram signal, whereby health information peculiar to the user can be accumulated in real-time and established as a database. Therefore, the present invention can be helpful in establishing a health monitoring system capable of monitoring a health state of a user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A biometric apparatus, comprising:
    an ADC (analog-to-digital converter) sampling an input bio signal to convert the sampled bio signal into a digital signal;
    a periodic signal extractor for extracting a plurality of periodic signals from the digital signal;
    a template storing portion registering a plurality of users and storing periodic signals for the respective registered users in a form of a template; and
    a comparator computing similarity by calculating distances between the periodic signals outputted from the periodic signal extractor and the respective templates to select a template whose calculated distance is smallest and recognizing a user who corresponds to the selected template as a user who corresponds to the input bio signal.

2. The apparatus as claimed in claim 1, wherein the periodic signal is expanded to a 35 harmonic Fourier series.

3. The apparatus as claimed in claim 1, wherein the template is one of sample values, Fourier coefficients, or Fourier coefficients spectrums.

4. The apparatus as claimed in claim 1, wherein the input bio signal is an electrocardiogram signal.

5. A biometric apparatus, comprising:
an ADC (analog-to-digital converter) sampling an input bio signal to convert the sampled bio signal into a digital signal;
a periodic signal extractor for extracting a plurality of periodic signals from the digital signal;
a periodic signal analyzer expanding the period signals to Fourier series to obtain Fourier coefficients for the periodic signals;
a template storing portion registering a plurality of users and storing Fourier coefficients of periodic signals for the respective registered users in form of templates; and
a comparator computing similarity by calculating distances between values outputted from the periodic signal analyzer and the respective templates to select a template whose calculated distance is smallest and recognizing a user who corresponds to the selected template as a user who corresponds to the input bio signal.

6. The apparatus as claimed in claim 5, wherein the calculated distance is computed as distances between the values outputted from the periodic signal analyzer and the respective templates, as given by the following equation:

$$distance_i = \sum_n \sqrt{(\overline{c_i} - c_n)^2}$$

where, i=a number of the registered users, n=a number of the periodic signals, $\overline{c_i}$: i-th template Fourier coefficient, $c_n$: Fourier coefficient of n-th periodic signal.

7. The apparatus as claimed in claim 6, wherein $\overline{c_i}$ is a value obtained by averaging the Fourier coefficients for a plurality of periodic signals obtained from an i-th registered user.

8. The apparatus as claimed in of claim 5, wherein the periodic signal analyser further obtains Fourier coefficient spectrums by applying Fourier transform to the Fourier coefficients, and the template storing portion stores the Fourier coefficient spectrum for each of the registered users as the template.

9. The apparatus as claimed in claim 8, wherein if the values outputted from the periodic signal analyser are the Fourier coefficient spectrums, the similarity is computed as distances between the Fourier coefficient spectrums and the respective templates, as given by the following equation:

$$distance_i = \sum_n \sqrt{(\overline{F_i}(t) - F_n(t))^2}$$

where, i: a number of the registered users, n: a number of the periodic signals, $\overline{F_i}$: i-th template Fourier coefficient spectrum, $F_n$: Fourier coefficient spectrum of n-th periodic signal.

10. The apparatus as claimed in claim 9, wherein $\overline{F_i}$ is a value obtained by averaging the Fourier coefficient spectrums for a plurality of periodic signals obtained from an i-th registered user.

11. The apparatus as claimed in claim 5, wherein the periodic signal is expanded to a 35 harmonic Fourier series.

12. The apparatus as claimed in claim 5, wherein the template is one of sample values, Fourier coefficients, or Fourier coefficients spectrums.

13. The apparatus as claimed in claim 5, wherein the input bio signal is an electrocardiogram signal.

14. The apparatus as claimed in claim 5, the comparator authenticates the user if the computed distance between template values of a user selected as an authentication target from the template storing portion if in case of 1:1 authentication.

15. The apparatus as claimed in claim 5, the comparator recognizes the user as a user who corresponds to a template whose distance between values stored in the template storing portion and values outputted from the periodic signal analyzer is smallest.

16. A biometric method, comprising:
sampling an input bio signal to convert the sampled bio signal into a digital signal;
extracting a plurality of periodic signals from the digital signal;
calculating, using at least one processing device, a similarity by calculating distances between the extracted periodic signals and template from a template storing portion to which a plurality of users are registered and periodic signal for the respective registered users as stored as the templates; and
selecting a template whose calculated distance is smallest and recognizing a user who corresponds to the selected template as a user who corresponds to the input bio signal.

17. The method as claimed in claim 16, wherein the extracting of the plurality of periodic signals further comprises obtaining the Fourier coefficients for the plurality of periodic signals, respectively, and the template storing portion stores corresponding Fourier coefficients for each registered user in a form of the templates.

18. The apparatus as claimed in claim 16, wherein the periodic signal is expanded to a 35 harmonic Fourier series.

19. The apparatus as claimed in claim 16, wherein the template is one of sample values, Fourier coefficients, or Fourier coefficients spectrums.

20. The apparatus as claimed in claim 16, wherein the input bio signal is an electrocardiogram signal.

21. A biometric method, comprising:
sampling an input bio signal to convert the sampled bio signal into a digital signal;
extracting a plurality of periodic signals from the digital signal;
calculating, using at least one processing device, a similarity between the extracted periodic signals and template from a template storing portion to which a plurality of users are registered and periodic signal for the respective registered users as stored as the templates; and
selecting a template whose similarity is greatest and recognizing a user who corresponds to the selected template as a user who corresponds to the input bio signal
wherein the similarity is computed as distances between the periodic signals and the respective templates, as given by the following equation:

$$distance_i = \sum_n \sqrt{(\overline{f_i}(t) - f_n(t))^2}$$

where, i: a number of the registered users, n: a number of the periodic signals, $\overline{f_i}$: sample value of i-th template, $f_n$: sample value of n-th periodic signal.

22. The method as claimed in claim 21, wherein $\overline{f_i}(t)$ is a value obtained by averaging a plurality of periodic signals obtained from an i-th registered user.

23. A biometric method, comprising:
sampling an input bio signal to convert the sampled bio signal into a digital signal;
extracting a plurality of periodic signals from the digital signal;
calculating, using at least one processing device, a similarity between the extracted periodic signals and template from a template storing portion to which a plurality of users are registered and periodic signal for the respective registered users as stored as the templates; and
selecting a template whose similarity is greatest and recognizing a user who corresponds to the selected template as a user who corresponds to the input bio signal,
wherein the extracting of the plurality of periodic signals further comprises obtaining the Fourier coefficients for the plurality of periodic signals, respectively, and the template storing portion stores corresponding Fourier coefficients for each registered user in a form of the templates, and a Fourier transform is applied to the Fourier coefficients to obtain Fourier coefficient spectrums, wherein the template storing portion stores corresponding Fourier coefficient spectrums for each registered user in a form of the templates.

24. The method as claimed in claim 23, wherein the similarity is computed as distances between the Fourier coefficient spectrums and the respective templates, as given by the following equation:

$$distance_i = \sum_n \sqrt{(\overline{c_i} - c_n)^2}$$

where, i: a number of the registered users, n: a number of the periodic signals, $\overline{F_i}$: i-th template Fourier coefficient spectrum, $F_n$: Fourier coefficient spectrum of n-th periodic signal.

25. The method as claimed in claim 24, wherein $\overline{F_i}$ is a value obtained by averaging the Fourier coefficient spectrums for a plurality of periodic signals obtained from an i-th registered user.

26. A computer-readable recording medium for recording a program executing a recognition method, comprising:
detecting a bio signal containing periodic signals from a user and sampling the bio signal to convert the sampled signal into a digital signal;
extracting the periodic signals from the digital signal;
reading templates from a template storing portion in which a plurality of users are registered and storing periodic signals for the respective registered users in a form of templates and computing similarity by calculating distances between the templates and the periodic signals of the user, respectively; and
recognizing a user that corresponds to a template whose calculated distance is smallest, as the user.

* * * * *

UNITED STATES PATENT AND TRADEMARK OFFICE
CERTIFICATE OF CORRECTION

PATENT NO. : 7,617,058 B2  Page 1 of 1
APPLICATION NO. : 11/268599
DATED : November 10, 2009
INVENTOR(S) : Kim et al.

It is certified that error appears in the above-identified patent and that said Letters Patent is hereby corrected as shown below:

Column 8, Line 55, after "signal" insert --,--.

Column 10, Lines 1-4, change

" $$distance_i = \sum_n \sqrt{(\overline{c}_i - c_n)^2}$$ "

to

-- $$distance_i = \sum_n \sqrt{(\overline{F_i(t)} - F_n(t))^2}$$ --.

Signed and Sealed this

Ninth Day of February, 2010

David J. Kappos
*Director of the United States Patent and Trademark Office*